Aug. 9, 1938.　　　W. A. SMITH, JR　　　2,126,673
PORTABLE POWER OPERATED TOOL
Filed June 10, 1937　　　2 Sheets-Sheet 1
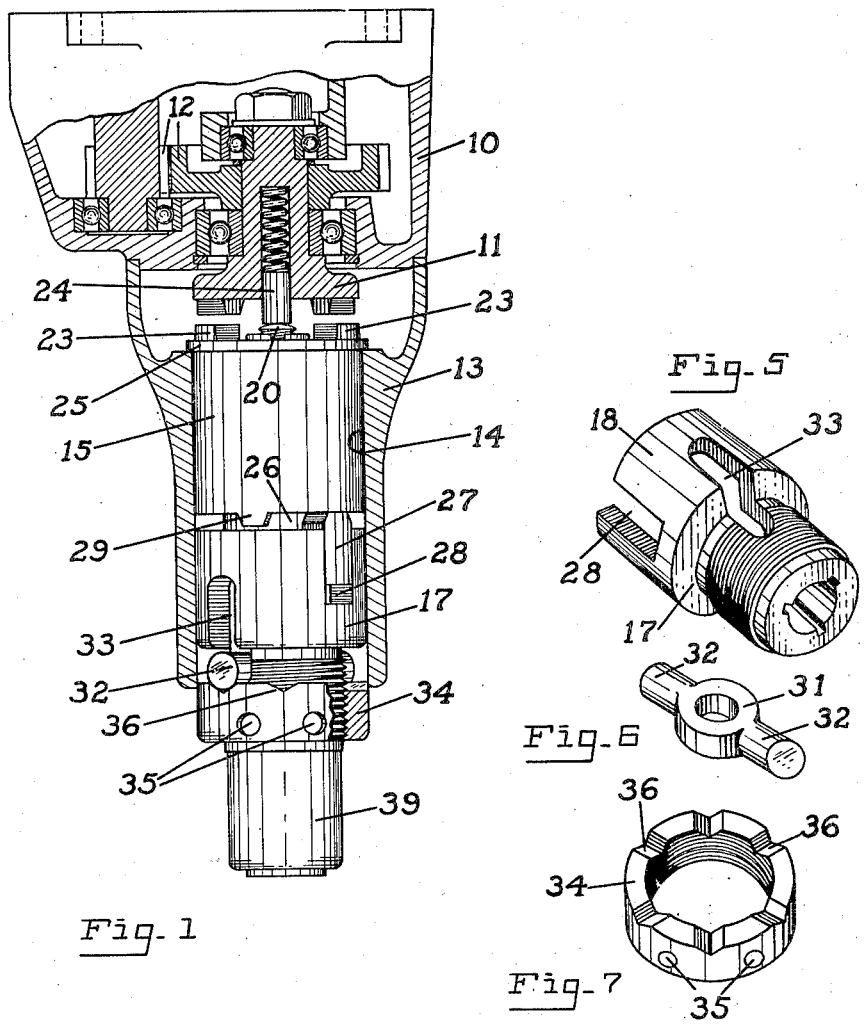
INVENTOR.
WILLIAM A. SMITH JR.
BY
ATTORNEY.

Aug. 9, 1938.    W. A. SMITH, JR    2,126,673
PORTABLE POWER OPERATED TOOL
Filed June 10, 1937    2 Sheets-Sheet 2
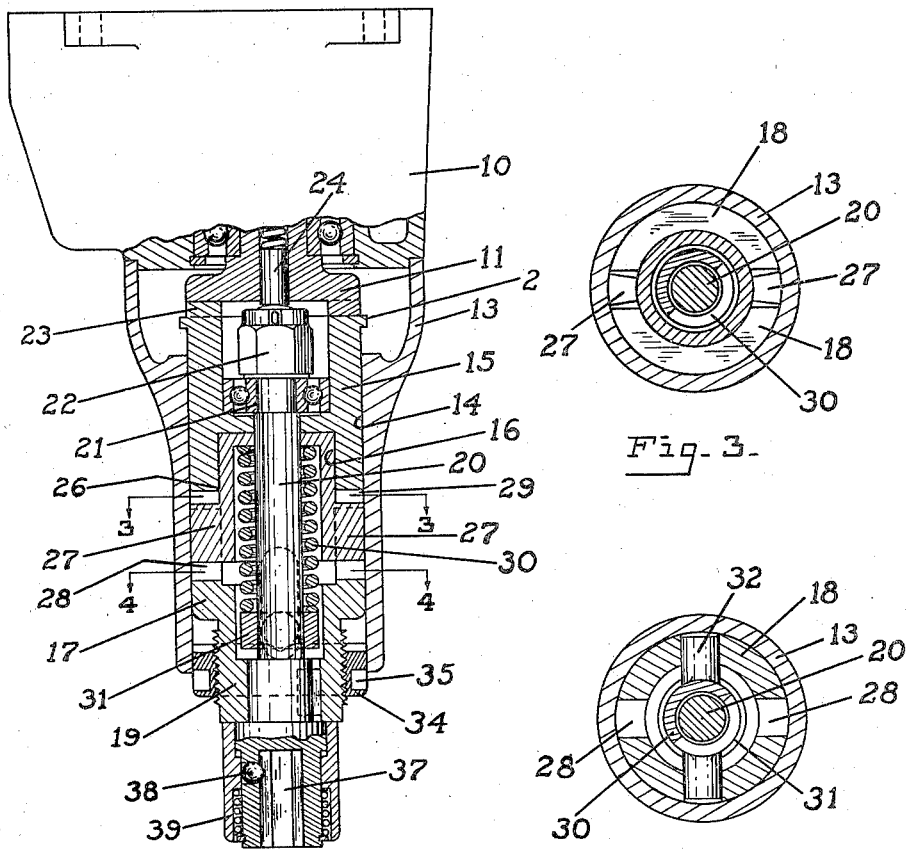
INVENTOR.
WILLIAM A. SMITH JR.
BY
ATTORNEY.

Patented Aug. 9, 1938

2,126,673

UNITED STATES PATENT OFFICE 2,126,673

PORTABLE POWER OPERATED TOOL

William A. Smith, Jr., Dayton, Ohio, assignor to The Buckeye Portable Tool Company, Dayton, Ohio, a corporation of Ohio Application June 10, 1937, Serial No. 147,536

16 Claims. (Cl. 64—29)

This invention relates to portable power operated tools and more particularly to clutch mechanism for use in such a tool, and is in the nature of an improvement upon the Wuebben Patent No. 2,043,502, of June 9, 1936.

One object of the invention is to provide a clutch mechanism of the automatic releasing type which will be simple in construction, efficient in operation and will comprise a small number of parts, which may be of small size.

A further object of the invention is to provide such a clutch in which the tension of the controlling spring may be quickly and easily adjusted from the exterior of the clutch mechanism.

A further object of the invention is to provide such a clutch with improved means for connecting a tool therewith.

Other objects of the invention may appear as the mechanism is described in detail.

In the accompanying drawings Fig. 1 is a sectional view of a portion of a power operated tool showing the clutch mechanism in elevation; Fig. 2 is a similar view showing the clutch mechanism in section; Fig. 3 is a section taken on the line 3—3 of Fig. 2; Fig. 4 is a section taken on the line 4—4 of Fig. 2; Fig. 5 is a detail view of the front driving member; Fig. 6 is a detail view of the spring support; and Fig. 7 is a detail view of the adjusting nut for the spring support.

In these drawings I have illustrated one embodiment of my invention and have shown the same as embodied in a portable tool of a well known type. This tool comprises a power unit including a housing, a portion of which is shown at 10, and in which is mounted a motor. Rotatably mounted in the housing is a clutch member 11 which may be connected with the motor or other source of power in any suitable manner, as by gearing 12. Rigidly secured to the housing 10 and enclosing the clutch member 11 is a tubular member 13 which constitutes a support for the clutch mechanism and is provided with a long bearing 14.

Rotatably mounted in the rear portion of the bearing 14 is a rear driving member, or clutch member, 15 having in its forward end a central cylindrical cavity 16. Rotatably mounted in the forward portion of the bearing 14 is a front driving member 17 having a cup-shaped rear portion 18 which has bearing contact with the bearing 14, and is spaced axially from the rear driving member 15. The forward portion of this front driving member is of reduced diameter and preferably projects slightly beyond the forward end of the tubular supporting structure 13. A spindle 20 is rigidly mounted in the reduced forward portion of the front driving member, extends rearwardly therefrom and has its rear portion mounted in a bearing 21 carried by the rear driving member 15. A nut 22 mounted on the spindle 20 engages the bearing 21 and holds the spindle against forward movement with relation thereto. Thus this spindle rigidly connects the two driving members one to the other in axially spaced relation but permits the rear driving member to have rotation with relation to the spindle and to the front driving member, with which the spindle is rigidly connected. The rear driving member may be connected with the motor or other source of power in any suitable manner but, in the construction here shown, this rear driving member is provided with clutch jaws 23 adapted to cooperate with the jaws of the clutch member 11 and these jaws 23 are moved into and out of operative engagement with the jaws of the clutch member 11 by the movement of the housing 10 with relation to the driving members. A spring pressed plunger 24, which is slidably mounted in the clutch member 11, engages the rear end of the spindle 20 and holds the jaws of the two clutch members normally in their separated positions when the tool is not in use but when the tool is applied to work and pressure exerted upon the housing 10 the clutch member 11 will be moved into engagement with the jaws 23 and a driving connection established between the motor and the rear driving member. The rear clutch member is preferably provided with a flange 25 to limit the forward movement of the rear clutch member with relation to the tubular supporting structure 13, it being understood that the two clutch members being rigidly connected together move axially in unison and to this end both driving members are slidably mounted in the bearing 14.

Interposed between the two driving members is a connecting member 26 which is preferably cup-shaped and has its rear portion rotatably mounted in the cavity 16 in the driving member 15. The forward portion of this connecting member is slidably mounted in the cup-shaped rear portion of the front driving member 17 and is provided with radial lugs 27 which extend into slots 28 in the opposite sides of the cup-shaped portion of the front driving member, thereby connecting the front driving member with the connecting member for rotation in unison therewith but permitting the connecting member to have axial movement with relation to the front driving member.

Means are provided for normally connecting the connecting member 26 with the rear driving member for rotation therewith and for disconnecting the same from said rear driving member when the front driving member, with which the connecting member rotates, is subjected to an excessive load which offers undue resistance to the rotation of the connecting member. In the present construction the rear driving member is provided on the annular front edge thereof with cam lugs 29 and the ends of the lugs 27 of the connecting member are beveled to constitute cam lugs which cooperate with the cam lugs 29 on the rear driving member. A spring 30 acts on the connecting member to press the same toward the rear driving member and thus normally maintain the lugs 27 of the connecting member in the path of the lugs 29 of the rear driving member, so that these two members will rotate in unison. When excessive resistance is offered to the rotation of the front driving member and connecting member the latter will be moved axially against the action of the spring by the contacting surfaces of the lugs 29 and 27, so that the lugs 29 will ride over the lugs 27 and the rear driving member will rotate with relation to the connecting member. As soon as the lugs 29 have cleared the lugs 27, the latter will be again moved into operative position by the action of the spring and when the rear driving member has completed approximately a half rotation the lugs 29 will again engage and ride over the lugs 27 and the impact between the lugs will impart a hammer blow to the front member and the tool connected therewith.

The amount of resistance to the rotation of the front driving member which is necessary to impart forward movement to the connecting member, and thus release the clutch mechanism, is determined in part by the angle at which the cam lugs 29 and 27 are beveled but is controlled largely by the tension of the spring 30 and may therefore be regulated by adjusting the tension of that spring. In the construction here shown, the spring 30 is confined between the rear end of the connecting member and a collar 31 which is slidably mounted on the spindle 20. This collar 31 is of course located within the front driving member and means are provided exteriorly of that driving member for adjusting the collar to vary the tension of the spring. In the particular construction here illustrated the collar is provided with laterally extending parts or trunnions 32 which extend through slots 33 in the front driving member and are supported at their outer ends by an adjusting member which is movably mounted on the exterior of the small diameter forward portion of the front driving member. Preferably this adjusting member is in the form of a nut 34 screw threaded onto the driving member and provided with suitable means for rotating the same, such as recesses 35 adapted to receive the end of an implement. The upper edge of this nut is provided with a circumferential series of V-shaped recesses 36 adapted to receive the trunnions 32 of the spring supporting collar, which are held normally in these recesses by the action of the spring 30, thus automatically locking the nut and holding the same normally against rotation but permitting it to be rotated by the application of sufficient force thereto.

The spindle 20 projects beyond the forward end of the front driving member and is provided with a socket 37 adapted to receive the shank of a tool, such as a socket wrench, and the shank is retained in the socket by means of a detent 38 which is held normally in its operative position by the usual chuck sleeve 39.

The operation of the mechanism will be understood from the foregoing description and it will be apparent that all parts of the clutch mechanism, except the adjusting nut 34 and the chuck, are enclosed within the tubular supporting structure 13 and these parts are few in number and of relatively small size, and that the tension of the spring may be readily adjusted from the exterior of the clutch by means of the nut 34, which is at all times accessible for operation.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a mechanism of the character described, front and rear driving members mounted for rotation about a common axis and having opposed internal cavities, means for establishing a slip connection between said driving members which will normally cause said members to rotate in unison but which will disconnect said members and permit the rear driving member to rotate with relation to the front driving member when excessive resistance is offered to the rotation of said front driving member, said means including a spring enclosed in said cavities, a support for said spring arranged in one of said cavities, and means arranged exteriorly of said front driving member and movable with relation thereto for adjusting said support to vary the tension of said spring.

2. In a mechanism of the character described, front and rear driving members mounted for rotation about a common axis, means including a spring for establishing a slip connection between said driving members which will normally cause said members to rotate in unison but which will disconnect said members and permit the rear driving member to rotate with relation to the front driving member when excessive resistance is offered to the rotation of said front driving member, a movable support for said spring having laterally extending parts, said front driving member having openings through which said parts extend, and an adjusting member arranged exteriorly of and having screw threaded connection with said front driving member and having supporting connection with said parts of said spring supporting member.

3. In a mechanism of the character described, front and rear driving members mounted for rotation about a common axis, means for rotatably connecting said rear driving member with said front driving member and for holding said driving members against relative axial movement, a connecting member interposed between said driving members and connected with said front driving member for rotation therewith and for axial movement with relation thereto, said connecting member and said front driving member having opposed internal cavities, a spring arranged in said cavities to act on said connecting member to press the latter toward said rear driving member, means controlled by said spring to normally connect said rear driving member and said connecting member for rotation in unison and to disconnect said members when excessive resistance is offered to the rotation of said front driving member, and means for adjusting said spring comprising a part arranged exteriorly of said front driving member and movable with relation thereto.

4. In a mechanism of the character described, front and rear driving members mounted for rotation about a common axis, means for rotatably connecting said rear driving member with said front driving member and for holding said driving members against relative axial movement, a connecting member interposed between said driving members and connected with said front driving member for rotation therewith and for axial movement with relation thereto, said front driving member having an internal cavity, a supporting member adjustably mounted in said cavity, a spring supported by said supporting member and acting on said connecting member to press the same toward said driving member, means controlled by said spring to normally connect said rear driving member and said connecting member for rotation in unison and to disconnect said members when excessive resistance is offered to the rotation of said front driving member, and a member for adjusting said spring supporting member arranged exteriorly of said front driving member and having screw threaded connection therewith.

5. In a mechanism of the character described, front and rear driving members mounted for rotation about a common axis, said front driving member having an internal cavity, means for establishing a slip connection between said driving members which will normally cause said members to rotate in unison but which will disconnect said members and permit the rear driving member to rotate with relation to the front driving member when excessive resistance is offered to the rotation of the latter, said means including a spring arranged in the cavity in said front driving member, a supporting member for said spring mounted in said cavity for adjustment lengthwise of said front driving member, and means arranged exteriorly of said front driving member and connected therewith for movement with relation thereto for adjusting said supporting member to vary the tension of said spring.

6. In a mechanism of the character described, front and rear driving members mounted for rotation about a common axis, means for rotatably connecting said rear driving member with said front driving member and for holding said driving members against relative axial movement, a connecting member interposed between said driving members and connected with said front driving member for rotation therewith and for axial movement with relation thereto, a spring acting on said connecting member to press the same toward said rear driving member, means controlled by said spring to normally connect said rear driving member and said connecting member for rotation in unison and to disconnect said members when excessive resistance is offered to the rotation of said front driving member, an adjustable support for one end of said spring, and a member for adjusting said support arranged exteriorly of said front driving member and having screw threaded connection therewith, said support and said adjusting member having parts cooperating to hold said adjusting member normally against movement with relation to said support.

7. In a mechanism of the character described, a supporting structure, a hollow front driving member and a rear driving member rotatably mounted in said structure, a spindle rigidly connected with said front driving member, means for rotatably connecting said rear driving member with said spindle and for holding the same against axial movement with relation to said spindle, a connecting member movably mounted about said spindle between said driving members and connected with said front driving member for rotation therewith and for axial movement with relation thereto, a supporting member mounted in said front driving member and arranged about said spindle for movement lengthwise thereof, a spring confined between said supporting member and said connecting member, cooperating parts carried by said rear driving member and said connecting member to normally connect said members for rotation in unison and to disconnect the same when excessive resistance is offered to the rotation of said front driving member, and means for adjusting said supporting member lengthwise of said spindle comprising a part connected with and arranged exteriorly of said front driving member.

8. In a mechanism of the character described, a supporting structure, a hollow front driving member and a rear driving member rotatably mounted in said structure, a spindle rigidly connected with said front driving member, means for rotatably connecting said rear driving member with said spindle and for holding the same against axial movement with relation to said spindle, a connecting member movably mounted about said spindle between said driving members and connected with said front driving member for rotation therewith and for axial movement with relation thereto, a supporting member mounted in said front driving member and arranged about said spindle for movement lengthwise thereof, a spring confined between said supporting member and said connecting member, cooperating parts carried by said rear driving member and said connecting member to normally connect said members for rotation in unison and to disconnect the same when excessive resistance is offered to the rotation of said front driving member, and a nut mounted on said front driving member and having supporting connection with said spring supporting member.

9. In a mechanism of the character described, a supporting structure, front and rear driving members rotatably mounted in said structure, a spindle rigidly connected with said front driving member, means for rotatably connecting said rear driving member with said spindle and for holding the same against axial movement with relation to said spindle, a connecting member movably mounted about said spindle between said driving members and connected with said front driving member for rotation therewith and for axial movement with relation thereto, a collar slidably mounted on said spindle and having laterally extending parts, said front driving member having openings through which said parts extend, a spring confined between said collar and said connecting member, cooperating parts carried by said rear driving member and said connecting member to normally connect said members for rotation in unison and to disconnect the same when excessive resistance is offered to the rotation of said front driving member, and a member mounted on said front driving member for adjustment lengthwise thereof and having supporting connection with said parts of said collar.

10. In a mechanism of the character described, a supporting structure, front and rear driving members rotatably mounted in said structure, a spindle rigidly connected with said front driving member, means for rotatably connecting said rear driving member with said spindle and for holding the same against axial movement with relation to said spindle, a connecting member movably mounted about said spindle between said driving members and connected with said front driving member for rotation therewith and for axial movement with relation thereto, a collar slidably mounted on said spindle and having laterally extending parts, said front driving member having openings through which said parts extend, a spring confined between said collar and said connecting member, cooperating parts carried by said rear driving member and said connecting member to normally connect said members for rotation in unison and to disconnect the same when excessive resistance is offered to the rotation of said front driving member, a nut mounted on said front driving member, having supporting engagement with said parts of said collar and having notches to receive said parts.

11. In a mechanism of the character described, a supporting structure having a long bearing, a rear driving member rotatably mounted in said bearing, having a cavity in the forward portion thereof and having cam lugs on the forward edge thereof, a front driving member rotatably mounted in said bearing, spaced axially from said rear driving member and having longitudinal slots, a cup-shaped connecting member interposed between said driving members, having a part rotatably mounted in the cavity of said rear driving member and having a part slidably mounted in said front driving member and provided with lugs extending through said slots, said lugs having cam portions to cooperate with the cam lugs on said rear driving member, a spring acting on said connecting member to press the same toward said rear driving member, a spindle rigidly secured to said front driving member, extending through said connecting member and rotatably connected with said rear driving member, and means for connecting a tool with said front driving member.

12. In a mechanism of the character described, a supporting structure having a long bearing, a rear driving member rotatably mounted in said bearing, having a cavity in the forward portion thereof and having cam lugs on the forward edge thereof, a front driving member rotatably mounted in said bearing, spaced axially from said rear driving member and having longitudinal slots, a cup-shaped connecting member interposed between said driving members, having a part rotatably mounted in the cavity of said rear driving member and having a part slidably mounted in said front driving member and provided with lugs extending through said slots, said lugs having cam portions to cooperate with the cam lugs on said rear driving member, a spring acting on said connecting member to press the same toward said rear driving member, a spindle rigidly secured to said front driving member, extending through said connecting member and rotatably connected with said rear driving member, said spindle projecting beyond the front end of said front driving member and having a socket to receive the shank of a tool.

13. In a mechanism of the character described, a supporting structure having a long bearing, a rear driving member rotatably mounted in said bearing, having a cavity in the forward portion thereof and having cam lugs on the forward edge thereof, a front driving member rotatably mounted in said bearing, spaced axially from said rear driving member and having longitudinal slots, a cup-shaped connecting member interposed between said driving members, having a part rotatably mounted in the cavity of said rear driving member nad having a part slidably mounted in said front driving member and provided with lugs extending through said slots, said lugs having cam portions to cooperate with the cam lugs on said rear driving member, a spindle rigidly secured to said front driving member, extending through said connecting member and rotatably connected with said rear driving member, a supporting member mounted about said spindle for adjustment lengthwise thereof, a spring confined between said supporting member and said connecting member, said front driving member having a part projecting beyond said bearing, and an adjusting member mounted on said part of said front driving member for movement lengthwise thereof and having supporting connection with said supporting member for said spring.

14. In a mechanism of the character described, front and rear driving members mounted for rotation about a common axis, means including a spring for establishing a slip connection between said driving members which will normally cause said members to rotate in unison but which will disconnect said members and permit the rear driving member to rotate with relation to the front driving member when excessive resistance is offered to the rotation of said front driving member, a support for said spring, means for adjusting said support to vary the tension of said spring, and means for automatically locking said adjusting means in its adjusted position.

15. In a mechanism of the character described, front and rear driving members mounted for rotation about a common axis, means including a spring for establishing a slip connection between said driving members which will normally cause said members to rotate in unison but which will disconnect said members and permit the rear driving member to rotate with relation to the front driving member when excessive resistance is offered to the rotation of said front driving member, a support for said spring, means for adjusting said support to vary the tension of said spring, said support and said adjusting means having cooperating parts arranged to be moved into and held in interlocking relation by the action of said spring to hold said adjusting means in its adjusted position.

16. In a mechanism of the character described, front and rear driving members mounted for rotation about a common axis, means including a spring for establishing a slip connection between said driving members which will normally cause said members to rotate in unison but which will disconnect said members and permit the rear driving member to rotate with relation to the front driving member when excessive resistance is offered to the rotation of said front driving member, a support for said spring, and an adjusting member mounted on said front driving member exteriorly thereof, said adjusting member and said support having cooperating parts held normally in interlocking relation by the action of said spring.

WILLIAM A. SMITH, Jr.